Feb. 1, 1938. W. HAHN 2,106,843
POWER TRANSMISSION GEAR FOR RAIL VEHICLES
Filed Feb. 15, 1936
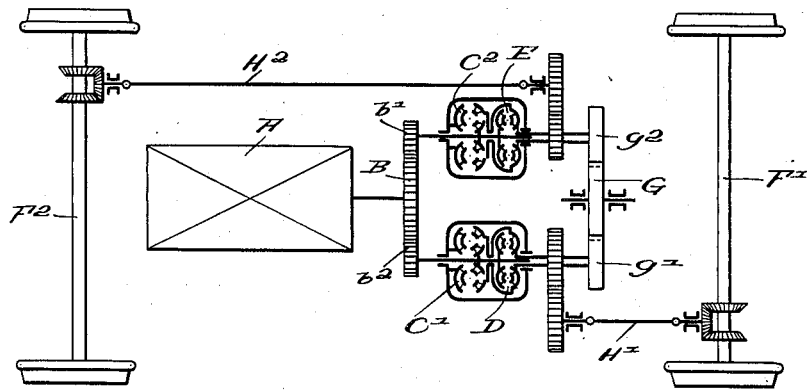
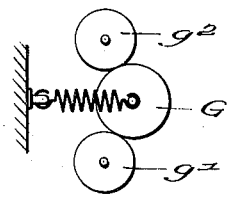
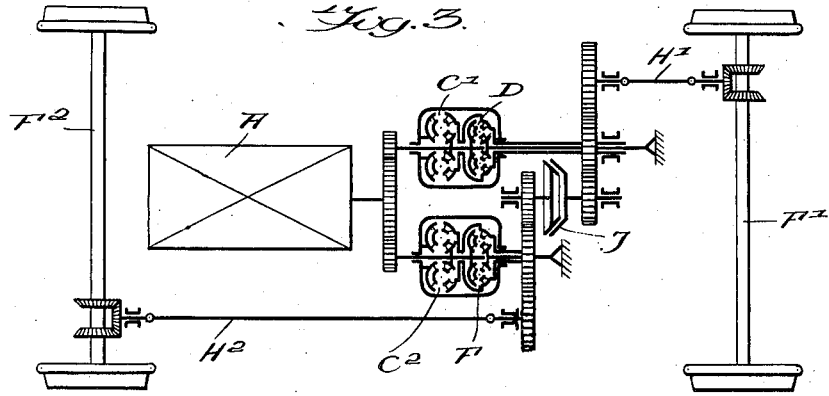
Inventor
Wilhelm Hahn,
By
Attorneys Patented Feb. 1, 1938

2,106,843

UNITED STATES PATENT OFFICE 2,106,843

POWER TRANSMISSION GEAR FOR RAIL VEHICLES

Wilhelm Hahn, Heidenheim-on-the-Brenz, Germany

Application February 15, 1936, Serial No. 64,105
In Germany February 16, 1935

11 Claims. (Cl. 105—130)

The invention relates to a power transmission gear for vehicles in which two or more drive axles are driven by only one power source over hydraulic circuit transmissions. The purpose of the invention is to form such a connection between the axles that vibrations of the driving gear between hydraulic circuit transmission and axle are eliminated. This is done by inserting a constantly acting non-positive coupling between the axles.

With power transmission gears, especially for railcars in which a driving motor drives on two or more axles, it was usual till now to couple the drive axles over flexible shafts and bevel gears positively with one another. In this arrangement it is necessary—in case of slight differences in the diameters of the drive wheels of the different axles—that the connecting parts overcome additionally the whole friction load of one of the axles. In order to avoid these tensions it has already been proposed to insert a mechanical differential gear between the two flexible shafts. From this arrangement, however, results the disadvantage that gliding of the drive wheels against the rails is more likely to happen so that it proved necessary, in the case of high speeds, to couple both flexible shafts positively together by means of a disengageable coupling. This arrangement, it is true, offers the advantage that the two axles may be separated from one another at low speeds; in the case of high speeds, however, this advantage disappears.

There is another possibility to solve this problem, namely, to drive both drive axles each by one separate hydraulic circuit transmission. In the case of this design the communication between the two drive axles is not positive but is effected by means of the working fluid in each of the hydraulic transmissions. A special proposal has been made in the direction that in such an arrangement the number of the driven axles may be reduced in the same degree as the driving speed of the vehicle increases and by this the traction force decreases. Herefrom results the advantage that the mechanical losses in the power transmission device become lower but, on the other side, the disadvantage that each of the axle drives has to be designed for full load. This arrangement has the disadvantage that, in the case of higher speeds and with driving only one axle the driven wheels glide against the rails.

According to the invention, these disadvantages are overcome by such an arrangement as shown in Figures 1 to 3. According to the example given in Fig. 1, the motor A drives over a gear B, $b^1$, $b^2$ two turbo transmissions each containing two hydraulic circuits or stages of speed which, for practical reasons and such of the traveling service, are designed in such a way that in starting the vehicle and for low speeds both hydraulic torque converters $C^1$ and $C^2$ are filled so that one hydraulic circuit $C^1$, $C^2$ of each of the turbo transmissions transmits one half of the whole output whilst the hydraulic circuits D and E are so designed that only one of them is filled while the other is empty so that each of them may transmit alone the whole output at higher speeds. These aforementioned two hydraulic circuits D and E do not work simultaneously so that the two higher stages of speed may be reached by filling and emptying these two circuits alternatively. Such filling and emptying arrangements are known to those skilled in the art. These two stages work positively on one axle $F^1$, $F^2$ each. According to the invention there is introduced between the two flexible shafts $H^1$, $H^2$ a resilient coupling in the form of a friction coupling G, $g^1$, $g^2$. This coupling is constantly engaged and designed for a certain maximum of torque. If the amount of torque is higher than this, the two parts of the friction coupling glide on one another.

Figure 2 shows a diagrammatical view of the aforementioned friction coupling in a side elevation.

Figure 3 shows another design of the arrangement according to the invention. In this case the friction coupling J is designed as a conical one which connects the two axles with one another. The other letters of this figure have the same signification as they have in Figure 1. The friction couplings shown in Figures 1 to 3 are adjustable for a certain maximum torque, as by the spring on the element G in Figure 2.

In the case of lower traveling speeds, the torques to be transmitted from motor A over the hydraulic circuits $C^1$ and $C^2$ are very high. As each of the flexible shafts $H^1$ and $H^2$ is driven by a special hydraulic circuit $C^1$ and $C^2$, the friction coupling only serves as a damping device for the vibrations of the flexible shafts $H^1$ and $H^2$ which may arise from the asynchronism of the two flexible shafts as a consequence of the unavoidable wear and tear of the driven wheels.

In the case of high traveling speeds, when the traveling of both drive axles $F^1$ and $F^2$ is effected by means of a single hydraulic circuit D or C, the friction coupling has to transmit one portion of the available torque to that flexible shaft which is not positively connected with the working hydraulic circuit, whereby this portion of torque is exactly determined by the adjustment of the friction coupling.

The arrangement of the friction coupling according to the invention brings along the advantages of the separate driving of the two flexible shafts $H^1$ and $H^2$ at low speeds, together with the advantage of the simultaneous drive of both driving axles $F^1$ and $F^2$; in the case of high speeds, moreover, it is possible to have an exact knowledge of the forces arising in the flexible shafts and in the gears by means of the adjustability of the friction coupling, and at the same time the possibility to transfer the driving torque in case of a breakdown of one flexible shaft or one axle drive by means of the friction coupling on the other drive axle or axles.

I claim:—

1. In combination, a prime mover, a plurality of driven axles, a plurality of hydraulic power transmitters separately connected to said prime mover and arranged to be alternately engageable selectively for power transmission, a positive drive mechanism arranged to connect a selected transmitter with one of said axles, and a yielding drive mechanism having a slip coupling with relatively slipping elements arranged to yieldingly connect the selected transmitter with another of said axles.

2. In combination, a prime mover, a plurality of driven axles, a pair of shafts connected to said prime mover, a hydraulic power-transmitting assembly connected to each shaft, each assembly including a hydraulic power transmitter adapted to transmit approximately one-half of the load and another hydraulic power transmitter adapted to transmit the full load, both half-load transmitters or a single full load transmitter being selectively engageable for power transmission, a drive mechanism arranged to connect each assembly with one driven axle, and a slip coupling with relatively slipping elements arranged to yieldingly interconnect said drive mechanisms whereby to yieldingly drive one axle and to positively drive another axle.

3. In combination, a prime mover, a plurality of driven axles, a plurality of hydraulic power transmitters separately connected to said prime mover, means for separately connecting the output side of each power transmitter to one only of said driven axles, and a slipping drive mechanism arranged to yieldingly interconnect the output sides of said power transmitters.

4. In combination, a prime mover, a plurality of driven axles, a plurality of hydraulic power transmitters separately connected to said prime mover and separately connected to said axles, and a slipping drive mechanism arranged to yieldingly interconnect the output sides of said power transmitters.

5. In combination, a prime mover, a plurality of driven axles, a plurality of hydraulic power transmitters separately connected to said prime mover, means for separately connecting the output side of each power transmitter to one only of said driven axles, a slipping drive mechanism arranged to yieldingly interconnect the output sides of said power transmitters, and means for adjustably varying the slippage of said slipping drive mechanism.

6. In combination, a prime mover, a plurality of driven axles, a plurality of hydraulic power transmitters separately connected to said prime mover and separately connected to said axles, a slipping drive mechanism arranged to yieldingly interconnect the output sides of said power transmitters, and means for adjustably varying the slippage of said slipping drive mechanism.

7. In combination, a prime mover, a plurality of driven axles, a plurality of hydraulic power transmitters separately connected to said prime mover and arranged to be alternately engageable selectively for power transmission, means for separately connecting the output side of each power transmitter to one only of said driven axles, and a slipping drive mechanism arranged to yieldingly interconnect the output sides of said power transmitters.

8. In combination, a prime mover, a plurality of driven axles, a plurality of hydraulic power transmitters separately connected to said prime mover and separately connected to said axles, said transmitters being arranged to be alternately engageable selectively for power transmission, and a slipping drive mechanism arranged to yieldingly interconnect the output sides of said power transmitters.

9. In combination, a prime mover, a plurality of driven axles, a pair of hydraulic power-transmitting assemblies separately connected to said prime mover, each assembly including two hydraulic power transmitters, the first power transmitter of the first assembly being arranged to operate simultaneously with the first power transmitter of the second assembly for distribution of the load therebetween, and the second power transmitter of said first assembly being arranged to operate alternately with the second power transmitter of said second assembly for transmission of the full load by one only of said second power transmitters, means for separately connecting the output side of each power transmitter to one only of said driven axles, and a slipping drive mechanism arranged to yieldingly interconnect the output sides of said hydraulic power transmitting assemblies.

10. In combination, a prime mover, a plurality of driven axles, a pair of hydraulic power-transmitting assemblies separately connected to said prime mover, each assembly including two hydraulic power transmitters, the first power transmitter of the first assembly being arranged to operate simultaneously with the first power transmitter of the second assembly for distribution of the load therebetween, and the second power transmitter of said first assembly being arranged to operate alternately with the second power transmitter of said second assembly for transmission of the full load by one only of said second power transmitters, said assemblies being separately connected to said driven axles, and a slipping drive mechanism arranged to yieldingly interconnect the output sides of said hydraulic power transmitting assemblies.

11. In combination, a prime mover, a plurality of driven axles, a pair of hydraulic power-transmitting assemblies separately connected to said prime mover, each assembly including two hydraulic power transmitters, one of said power transmitters consisting of a hydraulic torque converter, the torque converter of the first assembly being arranged to operate simultaneously with the torque converter of the second assembly for distribution of the load therebetween, and the second power transmitter of said first assembly being arranged to operate alternately with the second power transmitter of said second assembly for transmission of the full load by one only of said second power transmitters, said assemblies being separately connected to said driven axles, and a slipping drive mechanism arranged to yieldingly interconnect the output sides of said hydraulic power-transmitting assemblies.

WILHELM HAHN.